(12) United States Patent
Shaburov et al.

(10) Patent No.: US 11,922,356 B1
(45) Date of Patent: *Mar. 5, 2024

(54) EMOTION RECOGNITION FOR WORKFORCE ANALYTICS

(71) Applicant: Snap Inc., Santa Monica, CA (US)

(72) Inventors: Victor Shaburov, Castro Valley, CA (US); Yurii Monastyrshyn, Santa Monica, CA (US)

(73) Assignee: SNAP INC., Santa Monica, CA (US)

( * ) Notice: Subject to any disclaimer, the term of this patent is extended or adjusted under 35 U.S.C. 154(b) by 773 days.

This patent is subject to a terminal disclaimer.

(21) Appl. No.: 16/667,366

(22) Filed: Oct. 29, 2019

Related U.S. Application Data

(63) Continuation of application No. 15/688,480, filed on Aug. 28, 2017, now Pat. No. 10,496,947, which is a
(Continued)

(51) Int. Cl.
G06Q 10/0639 (2023.01)
G06V 40/16 (2022.01)
(Continued)

(52) U.S. Cl.
CPC . *G06Q 10/06395* (2013.01); *G06Q 10/06393* (2013.01); *G06V 40/174* (2022.01);
(Continued)

(58) Field of Classification Search
CPC ........ G06V 40/174; H04N 7/15; G10L 17/26; G10L 25/63
See application file for complete search history.

(56) References Cited

U.S. PATENT DOCUMENTS 6,038,295 A 3/2000 Mattes
6,980,909 B2 12/2005 Root et al.
(Continued)

FOREIGN PATENT DOCUMENTS

CA 2887596 A1 7/2015

OTHER PUBLICATIONS

U.S. Appl. No. 14/665,686 U.S. Pat. No. 9,747,573, filed Mar. 23, 2015, Emotion Recognition for Workforce Analytics.
(Continued)

*Primary Examiner* — Thomas H Maung
(74) *Attorney, Agent, or Firm* — SCHWEGMAN LUNDBERG & WOESSNER, P.A.

(57) ABSTRACT

Methods and systems for videoconferencing include generating work quality metrics based on emotion recognition of an individual such as a call center agent. The work quality metrics allow for workforce optimization. One example method includes the steps of receiving a video including a sequence of images, detecting an individual in one or more of the images, locating feature reference points of the individual, aligning a virtual face mesh to the individual in one or more of the images based at least in part on the feature reference points, dynamically determining over the sequence of images at least one deformation of the virtual face mesh, determining that the at least one deformation refers to at least one facial emotion selected from a plurality of reference facial emotions, and generating quality metrics including at least one work quality parameter associated with the individual based on the at least one facial emotion.

13 Claims, 12 Drawing Sheets

Related U.S. Application Data continuation of application No. 14/665,686, filed on Mar. 23, 2015, now Pat. No. 9,747,573.

(51) Int. Cl.

| | | |
|---|---|---|
| *G10L 25/63* | (2013.01) | |
| *H04N 21/4402* | (2011.01) | |
| *G10L 15/22* | (2006.01) | |
| *G10L 17/26* | (2013.01) | |
| *H04N 7/15* | (2006.01) | |
| *H04N 21/442* | (2011.01) | |
| *H04N 21/4788* | (2011.01) | |

(52) U.S. Cl.
CPC ........... *H04N 21/440218* (2013.01); *G10L 2015/227* (2013.01); *G10L 17/26* (2013.01); *G10L 25/63* (2013.01); *H04N 7/15* (2013.01); *H04N 21/44218* (2013.01); *H04N 21/4788* (2013.01)

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 7,668,401 B2 | 2/2010 | Marugame |
| 8,131,597 B2 | 3/2012 | Hudetz |
| 8,199,747 B2 | 6/2012 | Rojas et al. |
| 8,332,475 B2 | 12/2012 | Rosen et al. |
| 8,396,708 B2 | 3/2013 | Park et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,903,176 B2 | 12/2014 | Hill |
| 8,909,679 B2 | 12/2014 | Root et al. |
| 8,995,433 B2 | 3/2015 | Rojas |
| 9,036,018 B2 | 5/2015 | Wang et al. |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,269,374 B1* | 2/2016 | Conway ................ G06V 40/20 |
| 9,330,483 B2 | 5/2016 | Du et al. |
| 9,443,227 B2 | 9/2016 | Evans et al. |
| 9,489,661 B2 | 11/2016 | Evans et al. |
| 9,491,134 B2 | 11/2016 | Rosen et al. |
| 9,576,190 B2 | 2/2017 | Shaburov et al. |
| 9,747,573 B2 | 8/2017 | Shaburov et al. |
| 10,496,947 B1 | 12/2019 | Shaburov et al. |
| 2002/0002464 A1* | 1/2002 | Petrushin ................ G10L 17/26 704/275 |
| 2003/0012408 A1 | 1/2003 | Bouguet et al. |
| 2011/0202598 A1 | 8/2011 | Evans et al. |
| 2012/0002848 A1* | 1/2012 | Hill .......................... G16Z 99/00 382/118 |
| 2012/0209924 A1 | 8/2012 | Evans et al. |
| 2012/0323087 A1 | 12/2012 | Leon et al. |
| 2014/0163960 A1* | 6/2014 | Dimitriadis ............. G10L 25/63 704/9 |
| 2014/0278910 A1 | 9/2014 | Visintainer et al. |
| 2014/0362091 A1 | 12/2014 | Bouaziz et al. |
| 2015/0193718 A1 | 7/2015 | Shaburov et al. |

OTHER PUBLICATIONS

U.S. Appl. No. 15/688,480 U.S. Pat. No. 10,496,947, filed Aug. 28, 2017, Emotion Recognition for Workforce Analytics.

"U.S. Appl. No. 14/665,686, Non Final Office Action dated Sep. 15, 2016", 9 pgs.

"U.S. Appl. No. 14/665,686, Notice of Allowance dated Apr. 20, 2017", 10 pgs.

"U.S. Appl. No. 14/665,686, Response filed Feb. 15, 2017 to Non Final Office Action dated Sep. 15, 2016", 11 pgs.

"U.S. Appl. No. 14/665,686, Response filed Apr. 1, 2016 to Restriction Requirement dated Jun. 4, 2015", 12 pgs.

"U.S. Appl. No. 14/665,686, Restriction Requirement dated Jun. 4, 2015", 8 pgs.

"U.S. Appl. No. 15/683,480, Response filed May 30, 2019 to Non Final Office Action dated May 8, 2019", 8 pgs.

"U.S. Appl. No. 15/688,480, Non Final Office Action dated Mar. 8, 2019", 10 pgs.

"U.S. Appl. No. 15/688,480, Notice of Allowance dated Jul. 29, 2019", 8 pgs.

"U.S. Appl. No. 15/688,480, Preliminary Amendment filed Dec. 28, 2017", 9 pgs.

Ahlberg, Jorgen, "Candide-3: An Updated Parameterized Face", Image Coding Group, Dept. of Electrical Engineering, Linkoping University, SE, (Jan. 2001), 16 pgs.

Dornaika, F, et al., "On Appearance Based Face and Facial Action Tracking", IEEE Trans. Circuits Syst. Video Technol. 16(9), (Sep. 2006), 1107-1124.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

\* cited by examiner

905: Establish a video conference between an individual (e.g., an employee or agent) and a customer

910: Receive a video of the individual

915: Receive a request to generate work quality metrics of individual

920: Detect the individual (e.g., a face of individual) in one or more video images

925: Identify a plurality of feature reference points (e.g., facial landmarks) of the individual

930: Align a virtual face mesh to the individual in one or more of the video images

935: Determine at least one deformation of the virtual face mesh

940: Compare the determined deformation of the virtual face mesh to reference facial parameters of a plurality of reference facial emotions

945: Select a facial emotion from the plurality of reference facial emotions based on the result of comparison made at step 940

950: Generate quality metrics which include at least one work quality parameter associated with the individual based on the at least one facial emotion

955: Aggregate the quality metrics to produce a work performance characteristic of the individual and/or record the quality metrics (and optionally the work performance characteristic) in a database

*FIG. 9*

EMOTION RECOGNITION FOR WORKFORCE ANALYTICS

PRIORITY CLAIM

This application is a continuation of and claims the benefit of priority of U.S. patent application Ser. No. 15/688,480, filed on Aug. 28, 2017, which is a continuation of and claims the benefit of priority of U.S. patent application Ser. No. 14/665,686, filed on Mar. 23, 2015, which are hereby incorporated by reference herein in their entirety.

TECHNICAL FIELD

This disclosure relates generally to workforce analytics in video conferencing and, more particularly, to systems and methods for recognizing emotions of individuals, such as customer call center employees or agents, and aggregating related work quality metrics of the individuals when they interact with customers via a video conference.

DESCRIPTION OF RELATED ART

Today, video conferencing and videophone calls are popular tools for conducting two-way video and audio communications over long distances. This technology has been developing rapidly due to the emergence of high speed networking solutions, inexpensive hardware components, and deployment of cellular networks. Typically, video conferencing allows two or more individuals to communicate with each other using a variety of software applications, such as video chat applications, where the participants can view each other while talking. Video chats can be available on general-purpose computers, mobile devices, and television systems as downloadable software applications or web services. Traditional hardware requirements for video conferencing include, on each side, an input audio module (e.g., a microphone), input video module (e.g., a video camera), output audio module (e.g., speakers), output video module (e.g., a display or projector), and a computing device that ties together input and output modules, compresses and decompresses audio and video streams, and initiates and maintains the data linkage via a communications network.

Contact centers, such as customer call centers, can use videoconferencing because it provides direct communication with customers regardless of their location. For example, a video chat can enable face-to-face interactions between customer service representatives and customers. Typically, video chat sessions can be initiated from kiosks, mobile devices, and web and social media channels. This allows companies to provide personalized attention to each customer and conduct video interviews, sales, promotions, services, support, and other video collaboration.

There are many challenges and tasks that face contact centers, including, for example, high quality service, work efficiency, and profitability, among others. Moreover, contact centers typically stress that their employees stay emotionally positive when talking to customers, smile, and respond with respect and gratitude to whatever question a customer could ask. An employee's positive attitude can be easily affected by many factors such as tiredness, anger, emotional distress, and confusion. An angry and distressed employee may not provide high quality service to a customer, which ultimately may cause reduction in revenue, negative customer feedbacks, and loss of clients, among other factors. Accordingly, employers may want to introduce control processes to monitor the emotional status of their employees on a regular basis to ensure they stay positive and provide high quality service. On the other hand, this the introduction of control processes is not a trivial task especially for a company having dozens or even hundreds of customer service representatives.

SUMMARY

This disclosure relates generally to the technology for video-based workforce analytics, in which an emotional status of individuals, such as customer center employees and agents, can be recognized, recorded, and analyzed. In particular, this technology allows for video monitoring of the individuals when they video chat with customers. The video is processed in real time to determine an emotional status of an individual by identifying and tracking facial mimics. The present technology can recognize facial mimics by locating feature reference points (e.g., facial landmarks) on the video, aligning a virtual face mesh to the feature reference points, and determining mesh deformations that reflect face mimics of the individual. In some embodiments, audio can also be processed to determine speech or voice characteristics to improve emotion recognition. Once the emotional status of the individual is determined, the present technology allows for providing one or more work quality parameters such as employee tiredness, negative attitude to work, stress, anger, disrespect, and so forth. The work quality parameters can be collected and stored on a server for further display and analysis by employees or employer. For example, an employer can use this information for workforce optimization, laying-off underperforming employees, and promoting those employees that have a positive attitude towards customers.

According to one aspect of the technology, a computer-implemented method for videoconferencing is provided. The method comprises the steps of receiving a video including a sequence of images, detecting an individual in one or more of the images, locating feature reference points of the individual, aligning a virtual face mesh to the individual in one or more of the images based at least in part on the feature reference points, dynamically determining over the sequence of images at least one deformation of the virtual face mesh, determining that the at least one deformation refers to at least one facial emotion selected from a plurality of reference facial emotions, and generating quality metrics including at least one work quality parameter associated with the individual based on the at least one facial emotion.

In some embodiments, the method can further comprise recording the quality metrics of the individual in an employee record, wherein each of the quality metrics is time-stamped. In some embodiments, the method can further comprise establishing a video conference between the individual and a customer. In some embodiments, the method can further comprise aggregating the quality metrics associated with the individual over a predetermined period to produce a work performance characteristic of the individual.

In certain embodiments, the at least one work quality parameter includes one or more of the following: a tiredness characteristic of the individual, a negative emotion characteristic of the individual, a positive emotion characteristic of the individual, and a smile characteristic of the individual.

In certain embodiments, the step of determining that the at least one deformation refers to at least one facial emotion selected from a plurality of reference facial emotions can include: comparing the at least one deformation of the virtual face mesh to reference facial parameters of the plurality of reference facial emotions, and selecting the facial emotion based on the comparison of the at least one deformation of the virtual face mesh to the reference facial parameters of the plurality of reference facial emotions.

In certain embodiments, the step of comparing of the at least one deformation of the virtual face mesh to reference facial parameters can comprise applying a convolution neural network. In certain embodiments, the comparing of the at least one deformation of the virtual face mesh to reference facial parameters can comprise applying a state vector machine. In certain embodiments, the feature reference points can include facial landmarks. In certain embodiments, the step of detecting of the at least one individual can include applying a Viola-Jones algorithm to the images. In certain embodiments, the locating of the feature reference points can include applying an Active Shape Model (ASM) algorithm to areas of the images associated with the individual.

In certain embodiments, the aligning of the virtual face mesh can be based on shape units (SUs) associated with a face shape of the individual. In some embodiments, the method can further comprise estimating intensities of the SUs associated with the face shape, intensities of action units (AUs) associated with face mimics, rotations of the virtual face mesh around three orthogonal axes and its translations along the axes.

In certain embodiments, the plurality of facial emotions can include at least one of the following: a neutral facial emotion, a positive facial emotion, and a negative facial emotion. The positive facial emotion can include at least one of happiness, gratitude, kindness, and enthusiasm. The negative facial emotion can include at least one of anger, stress, depression, frustration, embarrassment, irritation, sadness, indifference, confusion, and annoyance.

In some embodiments, the method can further comprise receiving an audio stream associated with the video, and recognizing a speech emotion of the individual in the audio stream. In certain embodiments, the recognizing of the speech emotion can comprise: extracting at least one voice feature from the audio stream, comparing the extracted at least one voice feature to a plurality of reference voice features, and selecting the speech emotion based on the comparison of the extracted at least one voice feature to the plurality of reference voice features. In certain embodiments, the recognizing of the speech emotion can comprise recognizing a speech in the audio stream. In some embodiments, the method can further comprise combining the facial emotion and the speech emotion to generate the at least one work quality parameter of the individual.

According to another aspect of the technology, a computing system is provided. An example system comprises a computing device including at least one processor and a memory storing processor-executable codes, which, when implemented by the least one processor, cause the device to perform the method steps described above.

According to yet another aspect of the technology, a non-transitory processor-readable medium having instructions stored thereon, which when executed by one or more processors, cause the one or more processors to implement the method steps described above.

Additional objects, advantages, and novel features will be set forth in part in the detailed description, which follows, and in part will become apparent to those skilled in the art upon examination of the following detailed description and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which:

FIG. 9 is a process flow diagram showing an example method for video conferencing and conducting workforce analytics, which involve emotion recognition.

DETAILED DESCRIPTION

Figure 1A:
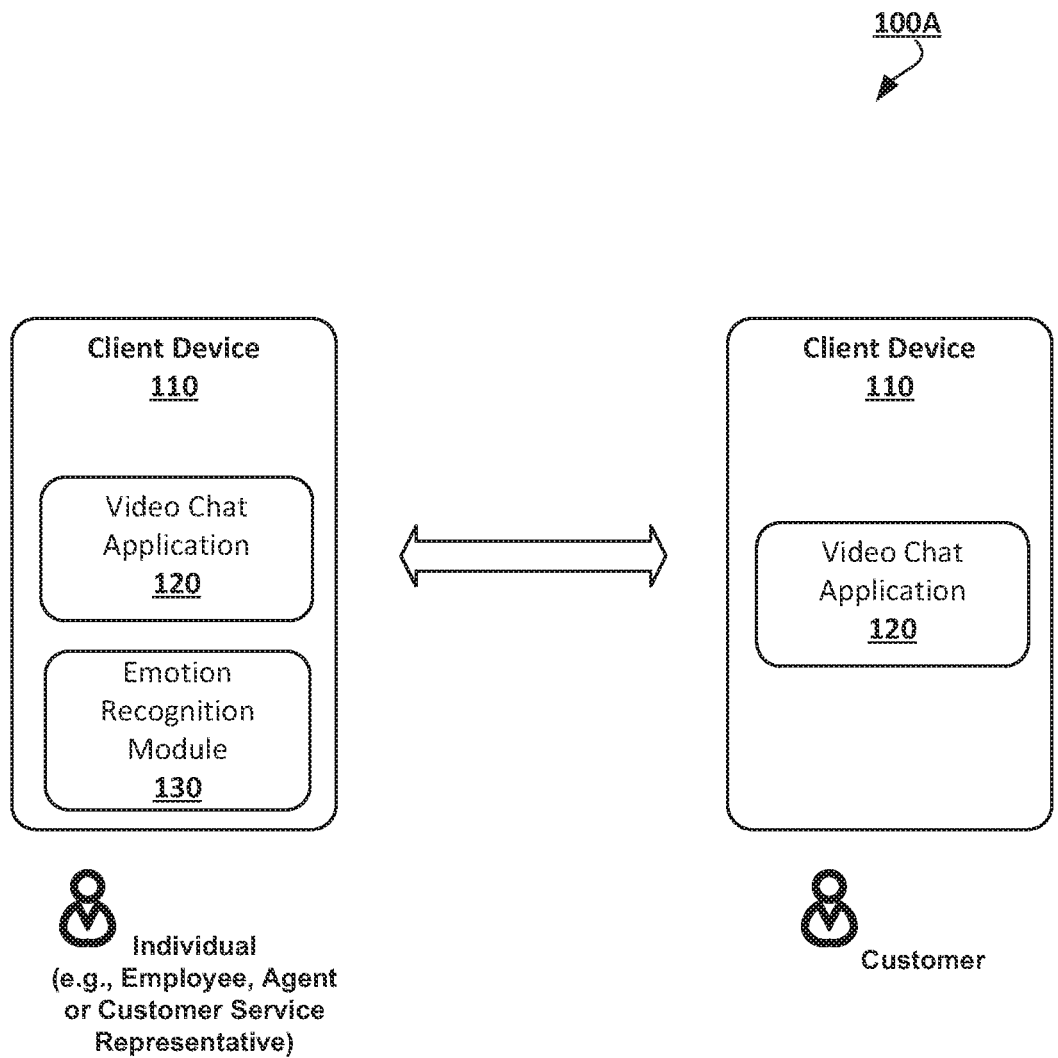
FIG. 1A shows a high-level block diagram of a first example system environment.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter.

The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Present teachings may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a transitory or non-transitory storage medium such as a disk drive or computer-readable medium. It should be noted that methods disclosed herein can be implemented by a server, network device, general-purpose computer (e.g., a desktop computer, tablet computer, laptop computer), mobile device (e.g., cellular phone, smart phone), game console, handheld gam-

1. INTRODUCTION

The present technology provides for methods and systems for workforce analytics in videoconferencing between a customer and a service provider such as a call center agent. The technology allows for determining an emotional status of the service provider by analyzing video images and/or audio associated therewith. More specifically, emotional status can be determined by identifying facial emotions and/or speech emotions. For these ends, the present technology allows for tracking changes in facial expressions and/or voice features over time. In various embodiments, facial emotions can be identified by locating feature reference points of the videoconference participant, aligning a virtual face mesh (also referred to as "mesh" for simplicity) based at least in part on the feature reference points, determining mesh changes that reflect and associated with face mimics, and comparing the mesh changes with reference facial parameters of a plurality of reference emotions stored in a database. Speech emotions can be identified by detecting voice features, and comparing the voice features to a plurality of reference voice features stored in a database. Once the emotional status is identified, it can be time-stamped, collected, stored, and analyzed to produce work quality metrics associated with the service provider.

The term "videoconferencing," as used herein, refers to a telecommunication technology, which allows two or more people to communicate by simultaneous two-way video and audio transmissions. The video transmissions include communicating a plurality of video images. In this disclosure, the term "video conferencing" incorporates similar terms including, for example, "videophone calling," "videotelephony," "video teleconferencing," and "video chat," among others.

The terms "individual" or "employee," as used herein, refer to an agent of a call center, a service provider, or a customer service representative. An employee or individual, as used herein, can also refer to a participant of a one-way or two-way video conference with a customer or prospective customer and subject to emotion recognition as described herein.

As discussed below, one of the core elements of this technology is detecting and tracking facial expressions (also referred herein to as "facial mimics") and optionally individual gestures in order to determine an emotional status of employees. According to various embodiments, facial expressions can be detected and tracked using a variety of video processing algorithms. For example, a face of employee can be detected using the combination of Viola-Jones algorithm, which is targeted to detect a face in video images, and an ASM algorithm, which is designed to locate feature reference points associated with the face. When the face is detected, a mesh based on the feature reference points can be aligned to the face in one or more of the video images. Further, changes and deformations of the mesh, which reflect and associated with face mimics, can be determined and analyzed. In one embodiment, changes and deformations of the mesh can be compared to reference facial parameters and based on the comparison, it can be determined that the mesh deformation refers to a facial emotion selected from a plurality of reference facial emotions. The emotional status of the employee can be based at least in part on the facial emotion, although the emotional status can be determined based on a combination of facial emotion and speech emotion. Optionally, the employee's gestures and vital parameters, such as heart rate and blood pressure, can also be used in determining the emotional status.

Further, work quality metrics can be generated based on the emotional status of the employee. The work quality metrics may include one or more work quality parameters such as employee tiredness, negative attitude to work, stress, anger, disrespect, depression, frustration, embarrassment, irritation, sadness, indifference, confusion, annoyance, and so forth. The work quality parameters may also include data identifying whether the employee smiled when he was video chatting with customers, when and for how long he smiled, and so forth. The work quality parameters can be collected and stored on a server for further display and analysis by employees or an employer. For example, an employer can use this information for workforce optimization, laying-off underperforming employees, promoting those employees that have positive attitudes towards customers, or making other administrative decisions.

The video processing algorithm, as described herein, can be applied to a video stream in real time or it can be applied to a stored video file (including progressive download solutions). Moreover, in some embodiments, the video processing can be applied to one or more video images individually, while in other embodiments, the video processing can be applied to a video as a whole. It should be also noted that the video processing steps can be implemented on either a client side or a server side, or both, depending on a particular system architecture.

2. COMPUTING ENVIRONMENT

In general, video conferencing can be implemented using one or more software applications running on a client side, server side, or both. In some embodiments, the video conferencing can be implemented as a web service or as a "cloud" solution, meaning it is available to videoconference participants via a website or web interface.

FIG. 1A shows a high-level block diagram of a first "peer-to-peer" example system environment 100A suitable for practicing the present technology. As shown in this figure, there are at least two client devices 110, each belonging to separate users in different locations. In one example, one user may refer to a customer, while another one may refer to an employee or agent (also referred herein to as "individual").

Client devices 110 refer to, but are not limited, a user device, terminal, computing device (e.g., laptop computer, tablet computer, desktop computer), cellular phone, smart phone, personal digital assistant (PDA), gaming console, remote control, multimedia system, television system, set-top box, infotainment system, in-vehicle computing device, informational kiosk, and so forth. Each of client devices 110 has a video chat application 120. The video chat applications 120 are generally configured to enable video conferencing between two or more users. Video chat applications 120 can be implemented as software, middleware or firmware; they can be implemented as a separate application or constitute a part of larger software applications.

At least one of client devices 110 further includes emotion recognition module 130, which is configured to detect a particular emotional status of employee. In some embodiments, emotion recognition module 130 is a separate software application, while in other embodiments emotion recognition module 130 is a part of another software application such as a video chat application 120, web service, and so forth.

As shown in FIG. 1A, client devices 110 are connected into a peer-to-peer (P2P) network allowing their direct video teleconferencing with each other. Data between nodes can be exchanged directly using, for example, TCP/IP (Transmission Control Protocol/Internet Protocol) network communication standards. In some embodiments, the P2P network can include more than two client devices 110.

Figure 1B:
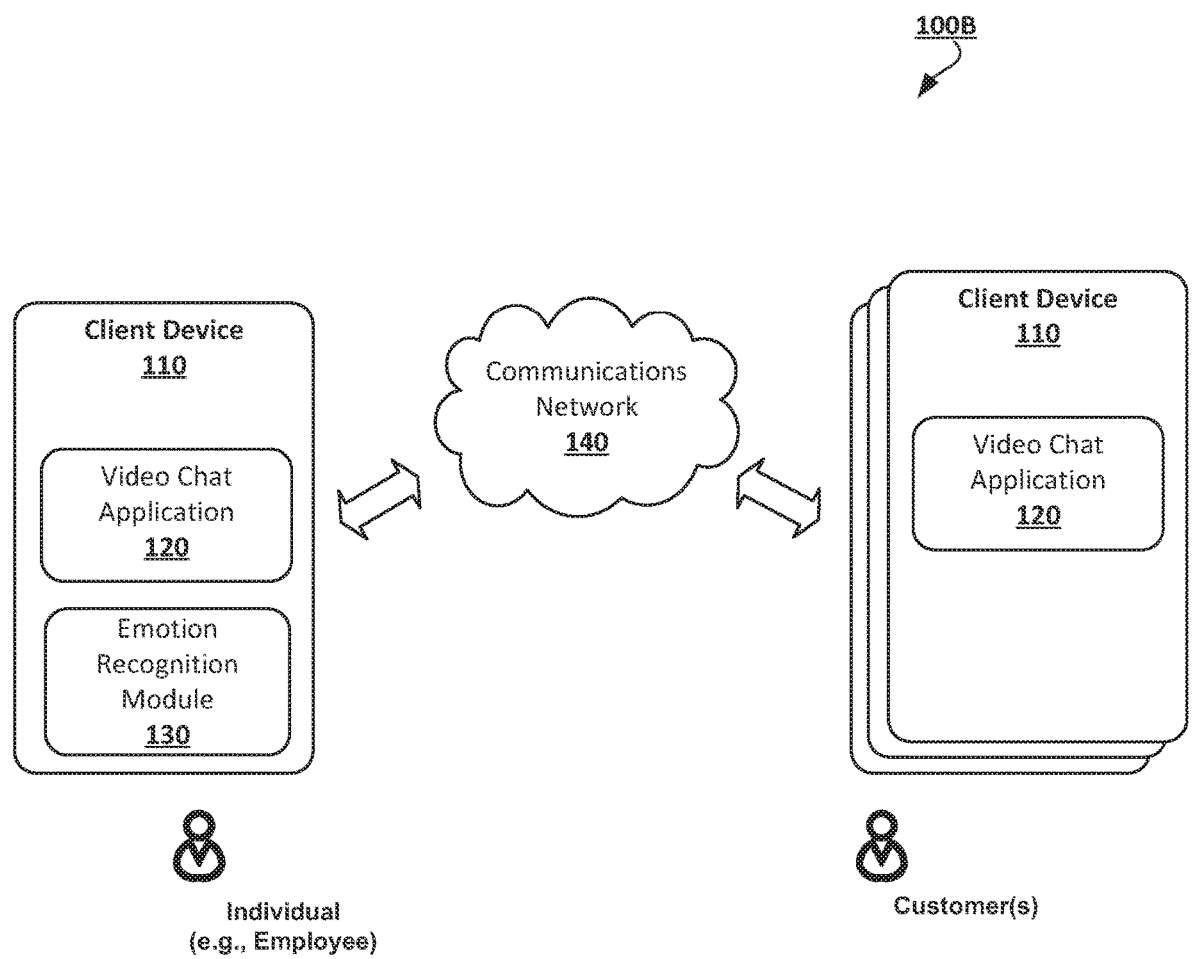
FIG. 1B shows a high-level block diagram of a second example system environment.

FIG. 1B shows a high-level block diagram of a second example system environment 100B suitable for practicing the present technology. As shown in this figure, the communication between client devices 110 is performed via a communications network 140. In various embodiments, communications network 140 may include one or more of the Internet, intranet, cellular network, local area network, wide area network, Institute of Electrical and Electronics Engineers (IEEE) 802.11 based network, Bluetooth radio, and so forth. Similar to above, video teleconferencing between client devices 110 can be implemented using, for example, TCP/IP network communication standards. In yet more embodiments, the employee may video chat with a plurality of customers.

Figure 2:
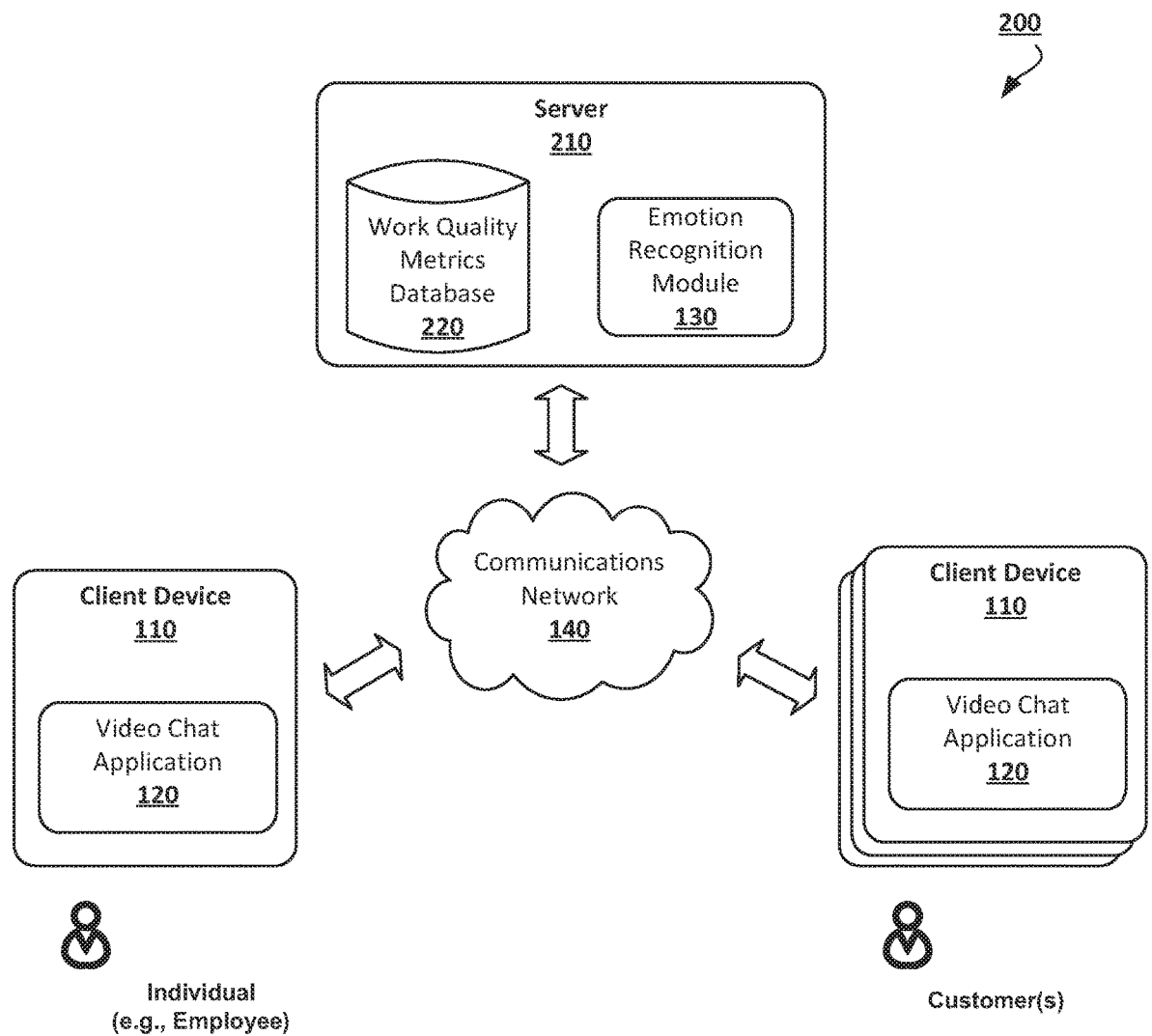
FIG. 2 shows a high-level block diagram of a third example system environment.

FIG. 2 shows a high-level block diagram of a third example system environment 200 suitable for practicing the present technology. In this embodiment, there is provided server 210 that includes emotion recognition module 130, while client devices 110 do not implement emotion recognition processes. Accordingly, emotion recognition, as well as other audio and video processing processes as described herein are implemented on server 210. The communication between video chat applications 120 and emotion recognition module 130 can include the use of application programming interface (API) codes.

In some embodiments, video streaming between client devices 110 can occur via server 210 such that client devices 110 are responsible for audio and video capture, audio and video delivery, and data transfer. In other embodiments, server 210 provides emotion recognition processes only, while client devices 110 implement the remaining communication tasks.

The server 210 may also employ a work quality metrics database 220 (for simplicity also referred to as database 220) for collecting, aggregating, and storing work quality metrics as generated or retrieved by emotion recognition module 130 during video chats with customers. In particular, database 220 can store work quality parameters, which are associated with time-stamped employee emotional status and reflect if they had a positive attitude when talked to customers, whether they were smiling, whether there were any behavioral or psychological problems of employees such as anger, distress, annoyance, and so forth. In some embodiments, each employee may have a record or profile stored in database 220. Each time a particular employee provides services to a customer using a video chat, the employee profile is updated with time-stamped parameters and optionally other data reflecting his work performance.

A relevant party may access records in database 220 to review and analyze them, and make administrative or management decisions. In one example, each employee may get access to the records in database 220, which are associated with this particular employee. In other embodiments, each employee may get access to the records in database 220, which are associated with this particular employee or any other employee. In yet more embodiments, a supervisor or manager of the employee, such as a human resource manager, can access records in database 220.

In some embodiments, a website can be employed to allow employers and/or employees to access, review, and analyze records of database 220 and/or employee profiles. The website may generate and display various graphs, charts, comparison tables, profile details, alerts, notifications, recommendations, and other information associated with the work quality metrics.

In yet more embodiments, the website or server 210 can generate automatic reports, notifications, or alerts to an employee or his manager, when one or more work quality parameters associated with the employee exceed predetermined threshold values. In yet other embodiments, the website or server 210 can generate automatic recommendations to an employee or his manager, when one or more work quality parameters associated with the employee exceed predetermined threshold values.

Figure 3:
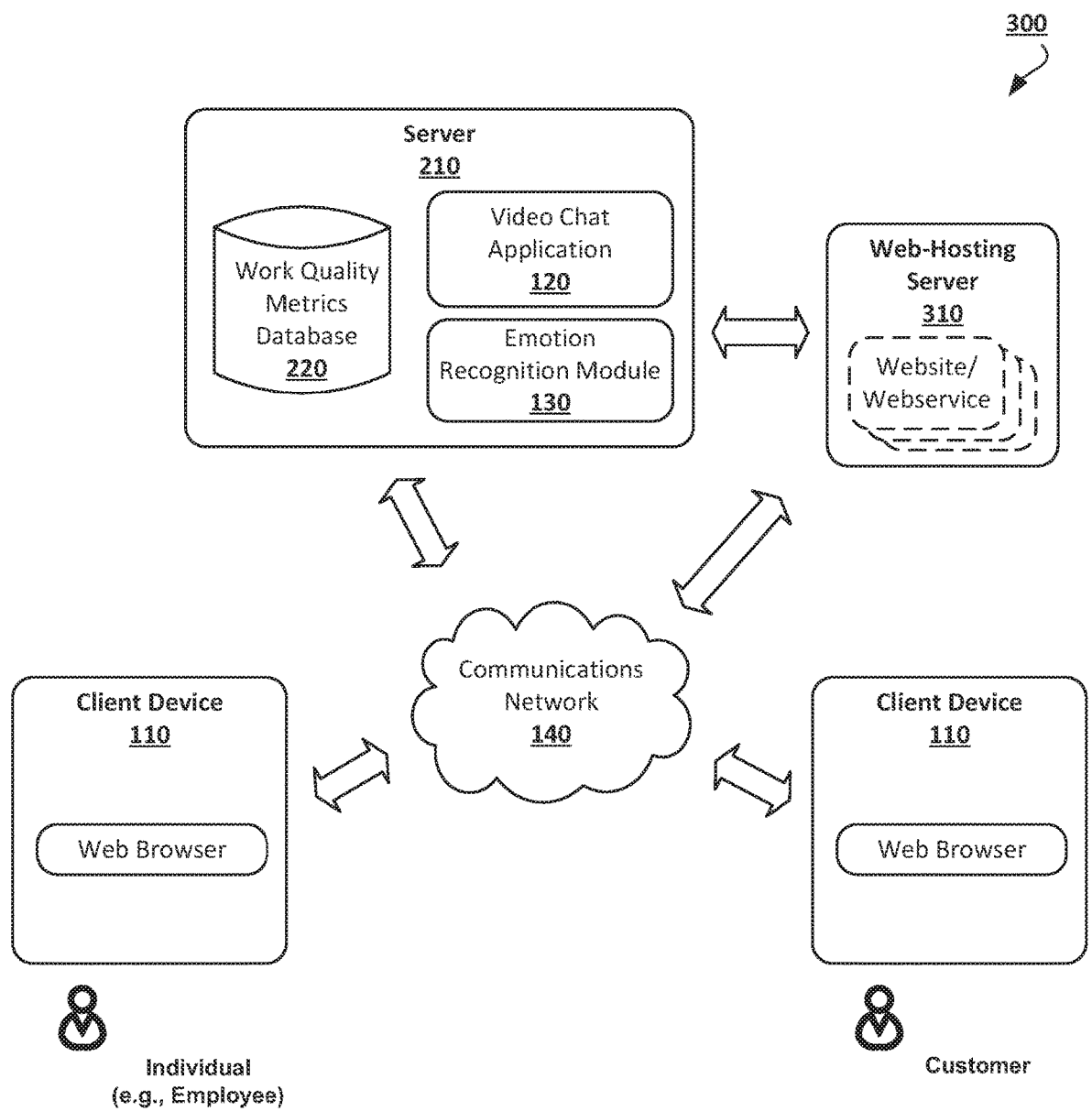
FIG. 3 shows a high-level block diagram of a fourth example system environment.

FIG. 3 shows a high-level block diagram of a fourth example system environment 300 suitable for practicing the present technology. In this example, client devices 110 include web browsers allowing the users to access a predetermined website or web service hosted by web-hosting server 310. Video chat application 120, in this embodiment, is located at server 210 and implemented as a web service associated with the website hosted by web-hosting server 310. Therefore, the video processing and emotion recognition processes, as described herein, are performed completely on the server side.

3. SYSTEM ARCHITECTURE AND PROCESS OVERVIEW

Figure 4:
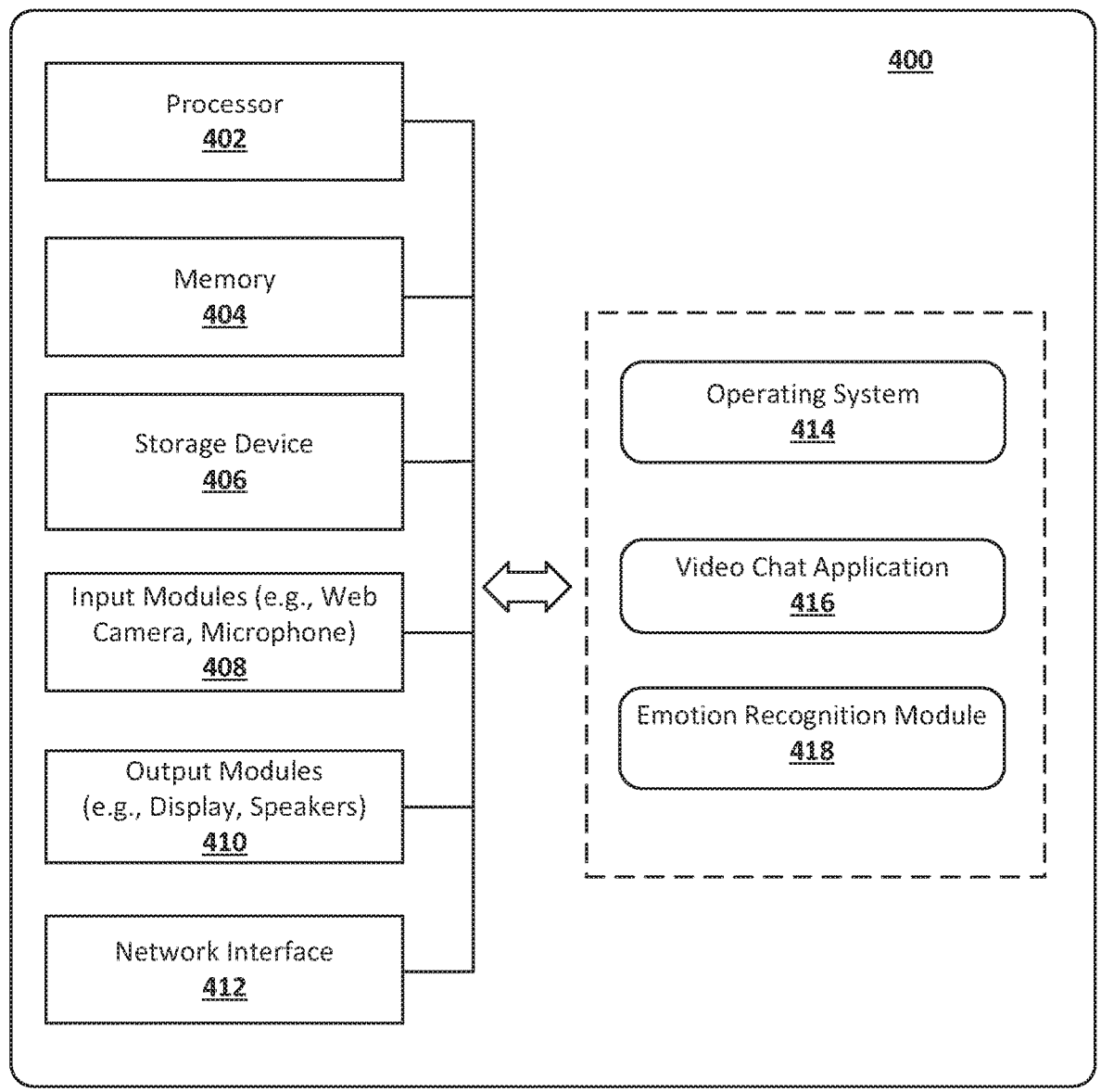
FIG. 4 is a high-level block diagram illustrating an example system suitable for implementing methods for video conferencing and conducting workforce analytics.

FIG. 4 is a high-level block diagram illustrating an example system 400 suitable for implementing the methods for video conferencing and conducting workforce analytics as described herein. Note that all components of system 400 may include logic elements, hardware components, software (firmware) components, virtual components, or a combination thereof. System 400 may include or relate to an integral part of one or more of a variety of types of devices and systems such as a general-purpose computer, network device, server, web service, Apache server, cloud-computing service, and so forth. In one example, system 400 refers to exemplary client device 110. Further, all modules shown in FIG. 4 may be operatively coupled using any suitable wired, wireless, radio, electrical, or optical standards.

As shown in this figure, system 400 includes the following hardware components: at least one processor 402, at least one memory 404, at least one storage device 406, at least one input module 408, at least one output module 410, and at least one network interface 412. System 400 also includes optional operating system 414, optional video chat application 416, and optional emotion recognition module 418. In some embodiments, system 400 may include database 220.

In various embodiments, processor 402 implements functionality and/or processes instructions for execution within the system 400. For example, processor 402 may process instructions stored in memory 404 and/or instructions stored on storage devices 406. Such instructions may include components of operating system 414 and video chat application 416. System 400 may include multiple processors 402 such as a central processing unit (CPU) and graphic processing unit (CPU), which can share operational tasks with each other.

Memory 404 is configured to store information within system 400 during operation. Memory 404, in some example embodiments, refers to a non-transitory computer-readable storage medium or a computer-readable storage device. In some examples, memory 404 is a temporary memory, meaning that a primary purpose of memory 404 may not be long-term storage. Memory 404 may also refer to a volatile memory, meaning that memory 404 does not maintain stored contents when memory 404 is not receiving power. Examples of volatile memories include random access memories (RAM), dynamic random access memories (DRAM), static random access memories (SRAM), and other forms of volatile memories known in the art. In some examples, memory 404 is used to store program instructions for execution by the processor 402. Memory 404 may be also used to temporarily store information during program execution.

Storage device 406 can include one or more transitory or non-transitory computer-readable storage media and/or computer-readable storage devices. In some embodiments, storage device 406 may be configured to store greater amounts of information than memory 404. Storage device 406 can be further configured for long-term storage of information. In some examples, storage device 406 includes non-volatile storage elements. Examples of such non-volatile storage elements include magnetic hard discs, optical discs, solid-state discs, flash memories, forms of electrically programmable memories (EPROM) or electrically erasable and programmable memories (EEPROM), and other forms of non-volatile memories known in the art.

Still referencing to FIG. 4, system 400 includes one or more input modules 408 for receiving user inputs and one or more output modules 410 for delivering data to a user. Input modules 408 may include keyboard, trackball, touchscreen, microphone, video camera, web camera, and the like. Output modules 410 may include any appropriate device to deliver data through visual or audio channels, including displays, monitors, printers, touchscreens, speakers, and so forth.

System 400 further includes network interface 412 which is configured to communicate with external devices, servers, and network systems via one or more communications networks 140. Network interface 412 may be a network interface card, such as an Ethernet card, optical transceiver, radio frequency transceiver, or any other device that can send and receive information. Other examples of such network interfaces may include Bluetooth®, 3G (Third Generation), 4G (Fourth Generation), LTE (Long-Term Evolution), and WiFi® radios.

Operating system 414 may control one or more functionalities of system 400 or components thereof. For example, operating system 414 may interact with video chat application 416 and may further facilitate interactions between video chat application 416 and processor 402, memory 404, storage device 406, input modules 408, output modules 410, and/or network interface 412. Video chat application 416 is configured to provide video conferencing services by implementing two-way audio and video communications with another system. System 400 may also include emotion recognition module 418 for dynamically recognizing emotional statuses of employees, generating work quality metrics associated with particular recognized emotional statuses, and updating employee records (profiles) with the work quality metrics as stored in database 220. As described below, emotion recognition module 418 can determine emotional statuses by analyzing particular features in video and/or audio streams. In some embodiments, system 400 may include additional software applications including, for example, web browsers, encoders, codecs, encryption application, etc.

Typical operation of system 400 is as follows. Video chat application 416 provides an interface, including a graphical user interface (GUI), enabling to initiate and conduct a videoconference between two or more users: an employee and a customer. A camera (i.e., within input module 408) captures a first video stream, which may include the employee (e.g., a customer service representative or service provider). A microphone (i.e., same input module 408) captures a first audio stream, which may include a speech of the employee. The first audio stream and/or first video stream is further transmitted to a server or a client device of another user via network interface 412. In some embodiments, the first audio stream and/or the first video stream can be modified by system 400 such as by making visual or acoustic adjustments, compression, encryption, and the like, before transmitting over a communications network. System 400 may also receive videoconference communications from the server or the client device of another user, which communications may include a second audio stream and/or a second video stream. These streams include video and audio content associated with the customer. The second audio stream and/or the second video stream may be optionally modified, for example, by making visual or acoustic adjustments, decompression, decryption, and the like. The second audio stream can be presented to the employee via speakers or headphones (e.g., output module 410). The second video stream can be displayed on a display (i.e., same output module 410).

Upon capture or receipt of first audio stream and/or first video stream associated with the employee, emotion recognition module 418 may determine an emotional status of the employee in real time. In some embodiments, the emotional status can be determined each predetermined period. For example, it can be determined every second, every two seconds, every three seconds, and so forth, or every video chat session. The emotional status is further used to generate one or more work quality parameters (such as ones that identify whether an employee had positive emotion when talking to a customer, whether he smiled, whether he was angry or distressed, etc.). Each work quality parameter may be time stamped. In some embodiments, each work quality parameter may indicate emotional status or other characteristics for a predetermined period. System 400 further updates employee records or an employee profile stored in database 220 with the work quality parameters or other characteristics associated with the emotional status of the employee.

4. FACE DETECTION

The instant technology allows for recognizing emotional statuses of employees based on detection of faces presented in a video stream and tracking facial emotions over time. This section is focused on example processes for face detection as can be used in the present technology.

Figure 5:
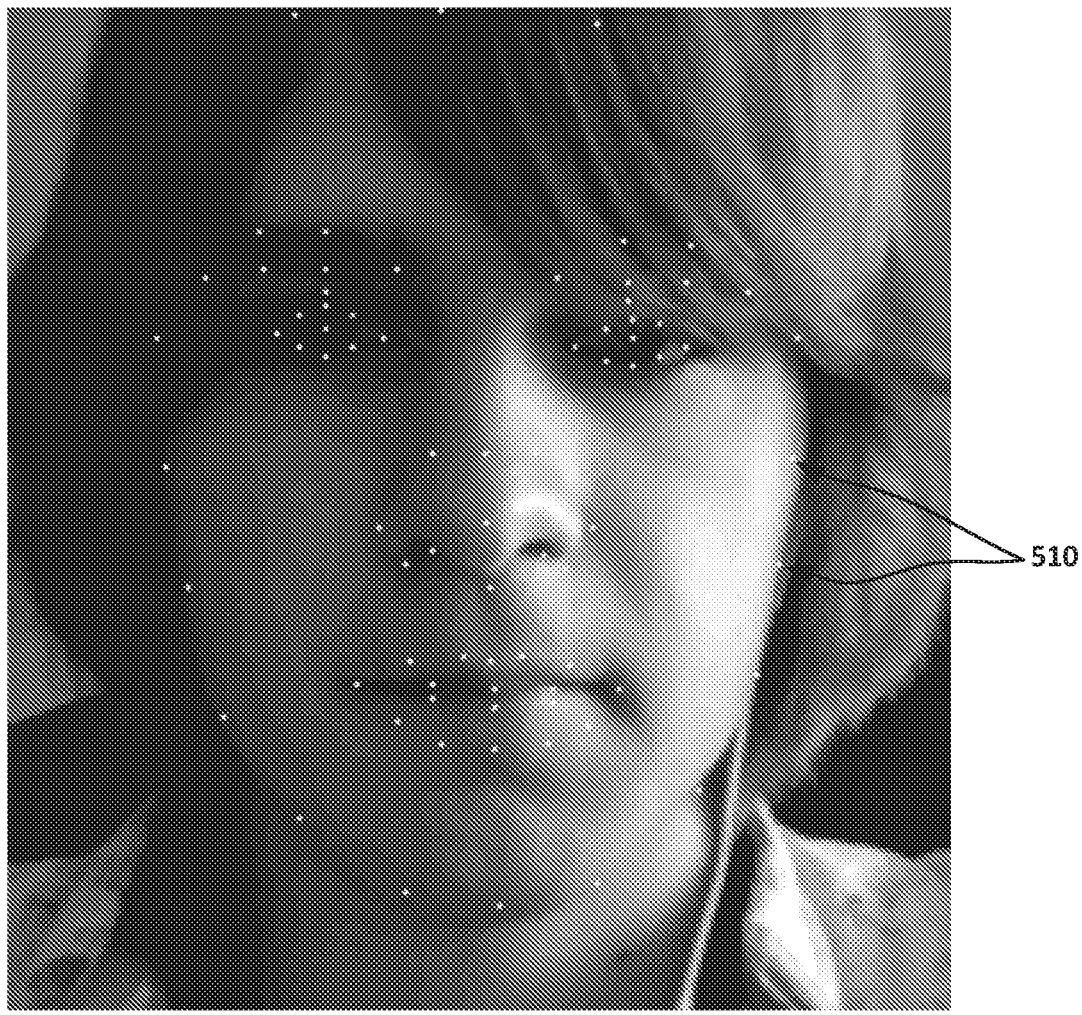
FIG. 5 shows an example image of a face with multiple reference feature points.

According to various embodiments, a face in an image can be detected by application of a Viola-Jones algorithm and an ASM algorithm. In particular, a Viola-Jones algorithm is a fast and accurate method for detecting a face region on an image. An ASM algorithm is applied to the face region to locate reference feature points associated with the face. These feature reference points can include one or more facial landmarks such as ala, philtrum, vermilion zonem, vermilion border, nasolabial sulcus, labial commissures, lip tubercle, nasion, outer canthos of eye, inner canthos of eye, and tragus of ear. Moreover, the feature reference points can include one or more of the following facial points indicating: eyebrows' vertical position, eyes' vertical position, eyes' width, eyes' height, eye separation distance, nose's vertical position, nose's pointing up, mouth's vertical position, mouth's width, chin's width, upper lip raiser, jaw drop, lip stretcher, left brow lowerer, right brow lowerer, lip corner depressor, and outer brow raiser. FIG. 5 shows an example image 500 of a face where some of example reference feature points 510 are illustrated.

Further, an ASM algorithm starts searching for feature reference points of a mean facial shape which is aligned to the position and size of the face presented in the input video image. An ASM algorithm then repeats the following two steps until convergence: (i) suggest a tentative shape by adjusting the locations of shape points by template matching of image texture around each point, and (ii) conform the tentative shape to a global shape model. The shape model pools the results of weak template matchers to form a stronger overall classifier. The entire search is repeated at each level in an image pyramid, from coarse to fine resolution. Thus, two sub-model types make up ASM, namely a profile model and a shape model.

The profile models (one for each landmark at each pyramid level) are used to locate an approximate position of each feature reference point by template matching. Any template matcher can be used, but the classical ASM forms a fixed-length normalized gradient vector (also known as a profile) by sampling the image along a line (also known as a whisker) orthogonal to the shape boundary at a landmark. While training on manually landmarked faces, at each landmark (feature reference point) the mean profile vector $\bar{g}$ and the profile covariance matrix $S_g$ are calculated. While searching, the landmark (feature reference point) along the whisker is displaced to the pixel whose profile $g$ has lowest Mahalanobis distance from the mean profile $\bar{g}$, where $$\text{MahalanobisDistance} = (g - \bar{g})^T S_g^{-1} (g - \bar{g}). \quad (1)$$

Further, the shape model specifies allowable constellations of landmarks. A shape of an individual can be given by its shape vector $x = (x_i^T)^T$, where $x_i$ is i-th facial landmark. The shape model generates the shape $\hat{x}$ with $$\hat{x} = \bar{x} + \Phi b \quad (2)$$

where $\bar{x}$ is the mean shape, b is a parameter vector, and $\varphi$ is a matrix of selected eigenvectors of profile covariance matrix $S_g$ of the points of the aligned training shapes. Using a standard principal components approach, the model has as many variations as it is desired by ordering the eigenvalues $\lambda i$ and keeping an appropriate number of corresponding eigenvectors in $\Phi$. In this process, a single shape model for the entire ASM is used but it may be scaled for each pyramid level.

Further, Equation 2 is used to generate various shapes by varying the vector parameter b. By keeping the elements of b within limits (determined during model building), it is possible to ensure that generated face shapes are lifelike. Conversely, given a suggested shape x, the method can calculate the parameter b that allows Equation 2 to better approximate x with a model shape $\hat{x}$. The method can further use an iterative algorithm to minimize $$\text{distance}(x, T(\bar{x} + \Phi b)) \quad (3)$$

where T is a similarity transform that maps the model space into the image space.

In one or more embodiments, CANDIDE-3 shape and initial state can be estimated based on a mapping of CANDIDE-3 vertices to weighted combinations of reference feature points located by ASM. CANDIDE-3 is a parameterized three-dimensional face mesh specifically developed for model-based coding of human faces. It includes a small number of polygons (approximately 100) and allows fast reconstruction. CANDIDE-3 is controlled by SUs, AUs, and a position vector. The SUs control mesh shape so as different face shapes can be obtained. The AUs control facial mimics so that different expressions can be obtained. The position vector corresponds to rotations around three (orthogonal) axes and translations along the axes.

Assuming that the observed face is frontal viewed in the image, only a yaw estimation is needed among the three rotation parameters. It can be found as an angle from the positive direction of the x-axis to a vector joining the right eye center feature point with the left one. The following equation system can be created, assuming that the observed face is neutral and frontal viewed in the image, and the vertices are projected on the image plane by scaled orthographic projection:

$$R\left\{ \begin{pmatrix} x_i \\ y_i \end{pmatrix} + \begin{pmatrix} \sum_{j=1}^m X_{ij} * b_j \\ \sum_{j=1}^m Y_{ij} * b_j \end{pmatrix} \right\} + \begin{pmatrix} x \\ y \end{pmatrix} = z \begin{pmatrix} \hat{x}_i \\ \hat{y}_i \end{pmatrix} \quad (4)$$

where $$R = \begin{pmatrix} \cos\theta & -\sin\theta \\ \sin\theta & \cos\theta \end{pmatrix}$$

is a rotation matrix, corresponding to the found yaw $\theta$, $b_j$ is j-th SU intensity; x, y, z are mesh translational coordinates; xi and yi are i-th mesh vertex model coordinates; $\hat{x}_i$ and $\hat{y}_i$ are i-th mesh vertex image coordinates obtained as weighted combinations of reference feature points; and Xij, Yij are coefficients, which denote how the i-th mesh vertex model coordinates are changed by j-th SU. Based on the foregoing, the following minimization can be made:

$$\left(x_i\cos\theta - y_i\sin\theta + \sum_{j=1}^m (X_{ij}\cos\theta - Y_{ij}\sin\theta) * b_j + x - z\hat{x}_i\right)^2 + \quad (5)$$

$$\left(x_i\sin\theta + y_i\cos\theta + \sum_{j=1}^m (X_{ij}\sin\theta + Y_{ij}\cos\theta) * b_j + y - z\hat{y}_i\right)^2 \to \min_{b_j,x,y,z}$$

The solution of this linear equation system is $$b = (X^T X)^{-1} X^T x \quad (6)$$

where $X = (((X_{ij} \cos\theta - Y_{ij} \sin\theta), 1, 0, -\hat{x}_i)^T, ((X_{ij} \sin\theta + Y_{ij} \cos\theta), 0, 1, -\hat{y}_i)^T)^T,$ $x = -((x_i \cos\theta - y_i \sin\theta)^T, (x_i \sin\theta + y_i \cos\theta)^T)^T,$ $$b = ((b_j)^T, x, y, z)^T. \quad (7)$$

In some embodiments, a Viola-Jones algorithm and ASM algorithm can be used to improve tracking quality. Face tracking processes can lose face position under some circumstances, such as fast movements and/or illumination variations. In order to re-initialize a tracking algorithm, in this technology, a Viola-Jones algorithm and ASM algorithm are applied in such cases.

5. FACE TRACKING

This section focuses on example processes for face tracking that can be used in the present technology. Face tracking is needed not only to detect facial expressions (i.e., facial mimics), but also for monitoring a disposition of a face within a field of view of a camera. Because individuals can move in each of the video images (frames), make gestures, and rotate or move their heads, face tracking is required to accurately determine facial expressions.

Figure 6:
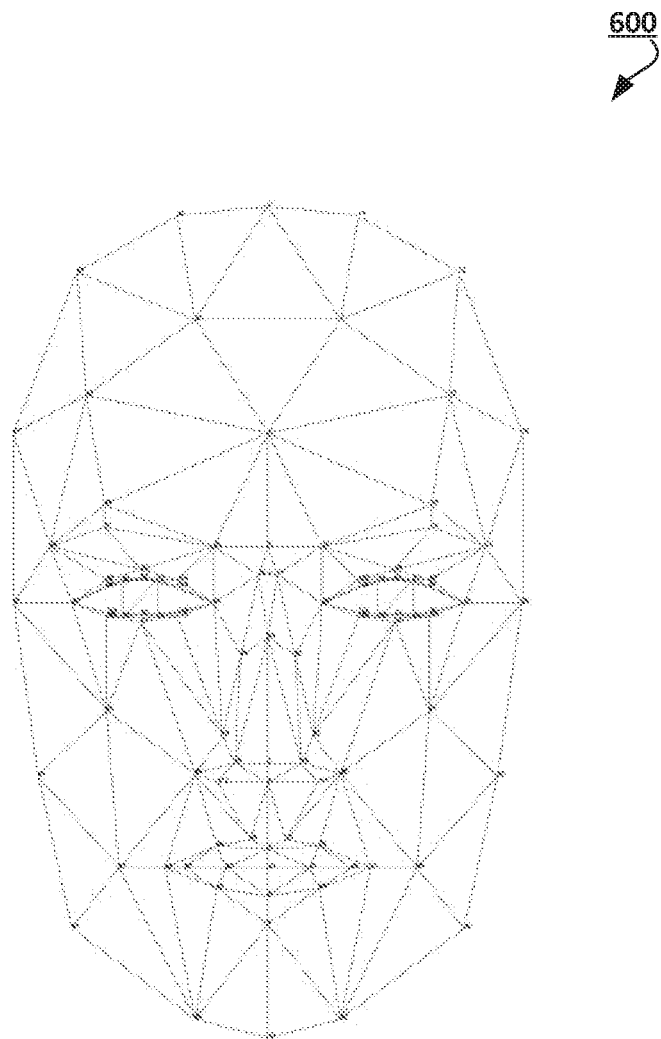
FIG. 6 shows an example mesh corresponding to a CANDIDE-3 model.

CANDIDE-3 model can be used for face tracking. See Jörgen Ahlberg, Candide-3 —an updated parameterized face, Technical report, Linköping University, Sweden (2001). FIG. 6 shows an exemplary virtual face mesh 600 corresponding to CANDIDE-3 model aligned to the face shown in FIG. 5.

In one or more embodiments, a state of CANDIDE-3 model can be described by an intensity vector of SUs, intensity vector of AUs and a position vector. SUs refer to various parameters of head and face. For example, the following SUs can be used: vertical position of eyebrows, vertical position of eyes, eyes' width, eyes' height, eye separation distance, nose vertical position, nose pointing up, mouth vertical position, mouth width, and chin width. AUs refer to face parameters that correspond to various face mimics. For example, the following AUs can be used: upper lip raiser, jaw drop, lip stretcher, left brow lowerer, right brow lowerer, lip corner depressor, and outer brow raiser.

Figure 7A:
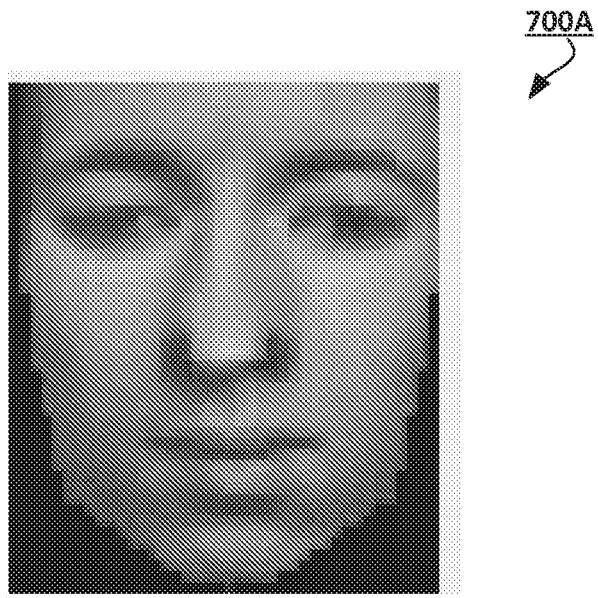
FIG. 7A shows an example mean face.
Figure 7B:
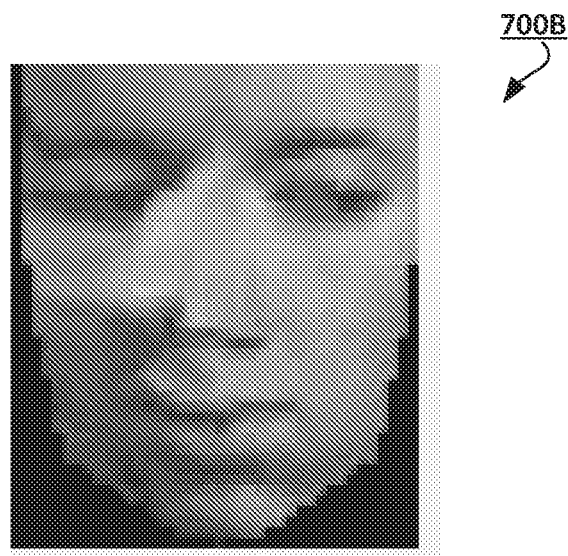
FIG. 7B shows an example observation under a current state of a mesh illustrated in FIG. 8.
Figure 8:
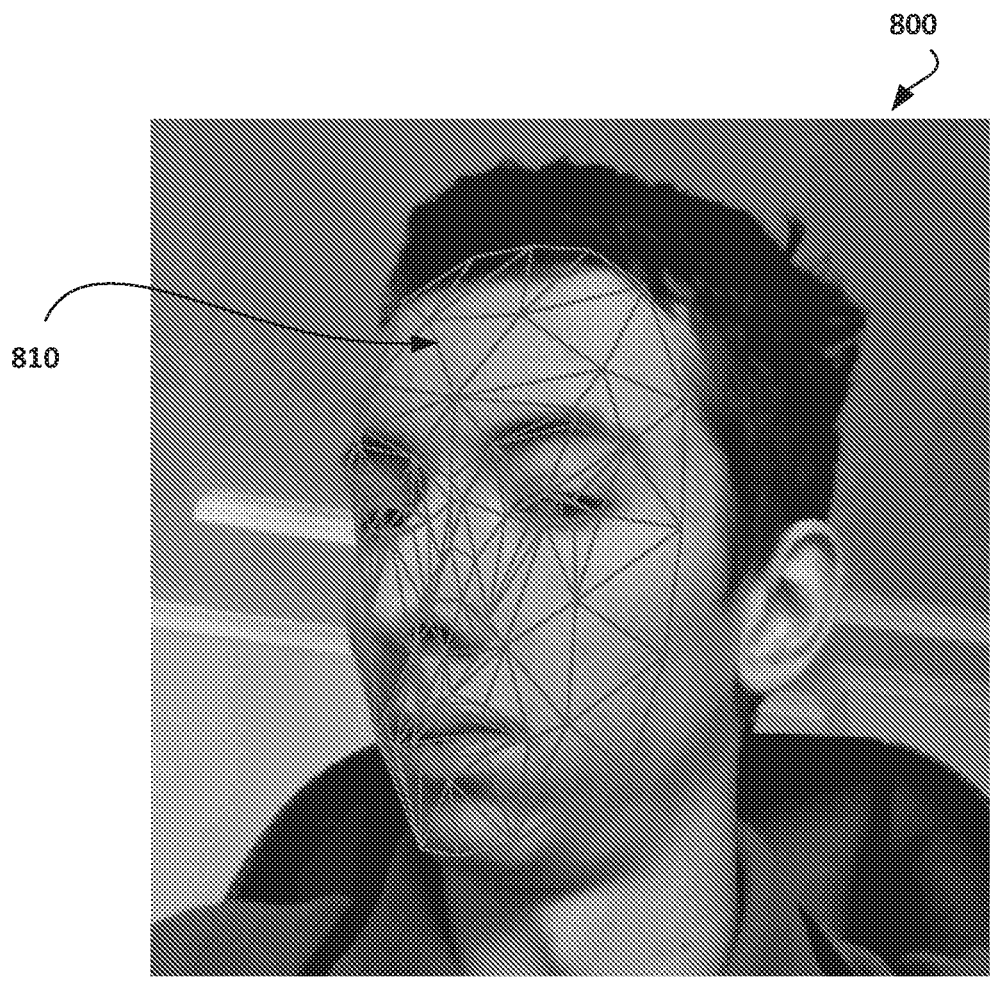
FIG. 8 shows an exemplary image having a face and a mesh aligned to the face.

The position of mesh, such as the mesh 600 shown in FIG. 6, can be described using six coordinates: yaw, pitch, roll, x, y, and z (scale). Following the Dornaika et al. approach, a mesh state can be determined by observing the region most likely to be a face. See Dornaika F. & Davoine F., On appearance based face and facial action tracking. IEEE Trans. Circuits Syst. Video Technol. 16(9):1107-1124 (2006). For each mesh state, observation errors can be calculated. Observation errors refer to a value indicating the difference between an image under a current mesh state and a mean face. FIG. 7A shows an example mean face 700A. FIG. 7B shows an example warped towards initial CANDIDE-3 state observation 700B under a current state of mesh 810 illustrated in FIG. 8. More specifically, FIG. 8 shows an exemplary image 800 of a face and the mesh 810 aligned to the face.

In one or more embodiments, a face modelled as a picture with a fixed size (e.g., width=40px, height=46px) is referred to as a mean face. In one or more embodiments, the observation process can be implemented as a warping process from the current CANDIDE-3 state towards its initial state, and denoted by $$x(b)=W(y,b) \quad (8)$$

where x denotes the observed image with the same size as the mean face, y denotes the input image, and b denotes the CANDIDE-3 AUs' intensities and position parameters. Gaussian distribution proposed in original algorithms has shown worse results compared to a static image. Thus, the difference between the current observation and mean face can be calculated as follows:

$$e(b)=(\log(1+I_m)-\log(1+I_i))^2 \quad (9)$$

where $I_m$ denotes pixels of the mean face image and $I_i$ denotes observation pixels.

Logarithm function can make the tracking more stable and reliable. In one or more embodiments, a Taylor series can be used to minimize error. The gradient matrix is given by $$G = \frac{\partial W(y,b)}{\partial b} = \frac{\partial x}{\partial b} \quad (10)$$

P Derivatives can be calculated as follows:

$$g_{ij} = \frac{W(y, b + \delta_j q_j)_i - W(y, b - \delta_j q_j)_i}{2\delta_j} \quad (11)$$

where $q_j$ is a vector with all elements zero except the j-th element that equals one.

Here, gi, is an element of matrix G. This matrix has size m*n, where m is larger than n (e.g., m is about 1600 and n is about 14). In case of straight-forward calculating, n*m operations of division have to be completed. To reduce the number of divisions, this matrix can be rewritten as a product of two matrices: G=A*B. Here, matrix A has the same size as G. Each element of matrix A can be represented as:

$$a_{ij}=W(y,b+\delta_j q_j)_i-W(y,b-\delta_j q_j)_i \quad (12)$$

Matrix B is a diagonal matrix with sizes n*n, and its elements can represented as follows:

$$b_{ii}=(2\delta_i)^{-1}$$

Matrix $G^+$ can be calculated as follows, which ultimately reduces a number of divisions:

$$G^+=(G^T G)^{-1}G^T=(B^T A^T AB)^{-1}B^T A^T=B^{-1}(A^T A)^{-1}B^{-T}B^T A^T=B^{-1}(A^T A)^{-1}A^T \quad (13)$$

This transformation allows making $n^3$ divisions instead of $m*n+n^3$.

Yet another optimization can be used in this method. If matrix $G^+$ is created and then multiplied by $\Delta b$, it leads to n2m operations, but if the first $A^T$ and $\Delta b$ are multiplied and then multiplied by $B^{-1}(A^T A)^{-1}$, there will be only $m*n+n^3$ operations, which is much better because n<<m.

Thus, face tracking in the video comprises CANDIDE-3 shape and initial state estimating that is based on located reference feature points associated with a particular face and aligning the mesh to the face in each video image. Notably, this process can be applied not only to a face, but also to other individual parts. In other words, this process of localization and tracking of a video conferencing participant may include localization and tracking one or more of the participant's face, his body, limbs, and/or other parts. In some embodiments, gesture detection and tracking processes can be also applied. In this case, the method may create a virtual skeleton and a mesh aligned to these body parts.

It should be also noted that ARM advanced SIMD (Single Instruction Multiple Data) extensions (also known as "NEON" provided by ARM Limited) can be used for multiplication of matrices in order to increase tracking performance. Also, a GPU (Graphics Processing Unit) can be used in addition to or instead of CPU (Central Processing Unit), whenever possible. To get high performance of GPU, operations can be arranged in a particular ways.

According to some embodiments of the disclosure, the face tracking process can include the following features. First, a logarithm can be applied to grayscale the value of each pixel to track it. This transformation has a great impact to tracking performance. Second, in the procedure of gradient matrix creation, the step of each parameter can be based on the mesh scale.

In order to automatically re-initialize the tracking algorithm in failure cases, the following failure criterion can be used:

$$\|W(y_t,b_t)-W(y_{t-1},b_{t-1})\|_2 > M \quad (14)$$

where $\|\cdot\|$ is Euclidean norm, $y_t$, $b_t$ are indexed by an image number t.

6. VIDEOCONFERENCING EMOTION RECOGNITION FOR WORKFORCE ANALYTICS

As outlined above, when faces or other parts of employees are detected, the present technology determines an emotional status of employees appearing in a video. This may include identification of facial expressions or changes in facial expressions over time. The emotional status can be also partly based on speech recognition or voice analysis. Based on the emotional status determined multiple times during a video chat with a customer, work quality metrics can be generated and stored in a database. These and other embodiments for emotion recognition in video conferencing are described below with reference to exemplary flow charts.

FIG. 9 is a process flow diagram showing an example method 900 for videoconferencing and conducting workforce analytics, which involves emotion recognition. The method may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of system 400. Note that below recited steps of method 900 may be implemented in an order different than described and shown in FIG. 9. Moreover, method 900 may have additional steps not shown herein, but which can be evident for those skilled in the art from the present disclosure. Method 900 may also have fewer steps than outlined below and shown in FIG. 9.

Method 900 commences at step 905 with establishing a video conference between an individual, such as an employee, an agent, a customer service representative or service provider, and a client, customer or prospective customer. For these ends, in one embodiment, video chat applications 120 can be used on each side. The establishment of a video conference means that video and audio streams are captured on each side and transmitted to another side, and vice versa.

Accordingly, at step 910, a computing device captures and/or receives a video of the individual. As a general matter, the video includes a sequence of video images (video frames) and the video can be received as a video stream meaning it can be continually supplied to the computing device (e.g., as progressive downloading) or it can be stored in a memory of the computing device. The video can be captured for video conferencing purposes, but not necessarily.

At optional step 915, the computing device receives a request to generate work quality metrics of the individual. In one example, the request can be generated manually by the individual or a third party such as an employee's supervisor, manager, or director. In another embodiment, the request is not needed or is generated automatically when the video conference is established at step 905.

At step 920, the computing device detects (localizes) the individual in one or more video images. As discussed above, the computing device can detect not only a face of the individual, but other parts of his or her body, including limbs, neck, arms, chest, and so forth, can be also detected. The detection can be based on a Viola-Jones algorithm, although other algorithms can be also used. In some other embodiments, the detection of the individual in one or more of the video images can be based on a user input. For example, the user input can include data associated with an image area related to the individual (e.g., individual's face).

At step 925, the computing device locates a plurality of feature reference points of individual (e.g., his face). The feature reference points can include one or more facial landmarks such as ala, philtrum, vermilion zonem vermilion border, nasolabial sulcus, labial commissures, lip tubercle, nasion, outer canthos of eye, inner canthos of eye, and tragus of ear. Moreover, the feature reference points can include one or more of the following facial points indicating: eyebrows vertical position, eyes vertical position, eyes width, eyes height, eye separation distance, nose vertical position, nose pointing up, mouth vertical position, mouth width, chin width, upper lip raiser, jaw drop, lip stretcher, left brow lowerer, right brow lowerer, lip corner depressor, and outer brow raiser. The feature reference points can be located using ASM or extended ASM algorithms as explained above. However, other procedures of facial landmark localization can also be used including, but not limited to, exemplar-based graph matching (EGM) algorithm, consensus-of-exemplars algorithm, and so forth.

At step 930, the computing device aligns a virtual face mesh to the individual (e.g., aligns the mesh to an image of the individual face) based at least in part on the reference feature points. This step can be performed with respect to just some of the video images. Alternatively, in some embodiments, this step can be performed with respect to each video image. In some embodiments, at step 930, the computing device may optionally generate the mesh or retrieve a predetermined mesh. As discussed above, a parameterized face mesh, such as CANDIDE-3 model, can be aligned to the individual. CANDIDE-3 is a parameterized three-dimensional face mesh that can be aligned to an individual face shape based on calculation of intensities of SUs. In some embodiments, the aligning of the virtual face mesh can be based on estimating intensities of the SUs associated with the face shape, estimating intensities of AUs associated with face mimics, estimating rotations of the virtual face mesh around three orthogonal axes and its translations along the axes.

At step 935, the computing device determines at least one deformation of the mesh over a plurality or sequence of video images. Mesh deformation can include relative disposition of one or more mesh vertices because of a change in emotional expression by the individual. For example, the computing device can determine modification of the mesh that reflects moving the labial commissure landmarks as well as the movement of eyebrows. In another example, the computing device can determine modification of the mesh that reflects moving the outer and inner canthus of the eyes, as well as mouth landmarks moving. It should be appreciated that mesh can be deformed in a variety of different ways. In any case, the computing device can track changes in position of each mesh vertex (mesh point, or mesh joint), as well as a distance between each of the mesh vertices to determine changes in facial emotions.

At step 940, the computing device compares the determined deformation of the mesh to reference facial parameters of a plurality of reference facial emotions. The reference facial parameters and the reference facial emotions can be stored in one or more databases located, for example, in a memory of computing device. The reference facial emotions may include, for example, neutral facial emotions, positive facial emotions, and negative facial emotions. In some embodiments, the positive facial emotions may include one or more of the following: happiness, gratitude, kindness, enthusiasm, loyalty, and the like. In certain embodiments, the negative facial emotions may include one or more of the following: anger, stress, depression, frustration, embarrassment, irritation, sadness, indifference, confusion, annoyance, indignation, dissatisfaction, and vexation.

The step 940 of comparing may include applying at least one machine-learning algorithm such as a convolution neural network (CNN) and/or a state vector machine (SVM). Generally, CNN is a type of feed-forward artificial neural network where the individual neurons are tiled in such a way that they respond to overlapping regions in the visual field. CNNs consist of multiple layers of small neuron collections, which look at small portions of the input image, called receptive fields. The results of these collections are then tiled so that they overlap to obtain a better representation of the original image; this is repeated for every such layer. Convolutional networks may include local or global pooling layers, which combine the outputs of neuron clusters. They also consist of various combinations of convolutional layers and fully connected layers, with pointwise nonlinearity applied at the end of or after each layer. To avoid the situation that there exist billions of parameters if all layers are fully connected, the idea of using a convolution operation on small regions, has been introduced. One major advantage of convolutional networks is the use of shared weight in convolutional layers, which means that the same filter (weights bank) is used for each pixel in the layer; this both reduces required memory size and improves performance.

SVMs are supervised learning models with associated learning algorithms that are configured to recognize patterns. Given a set of training examples, with each marked as belonging to one of two categories, an SVM training algorithm builds a model that assigns new examples into one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall on.

Figure 10A:
FIG. 10A shows an example positive facial emotion with a mesh aligned to a face area.
Figure 10B:
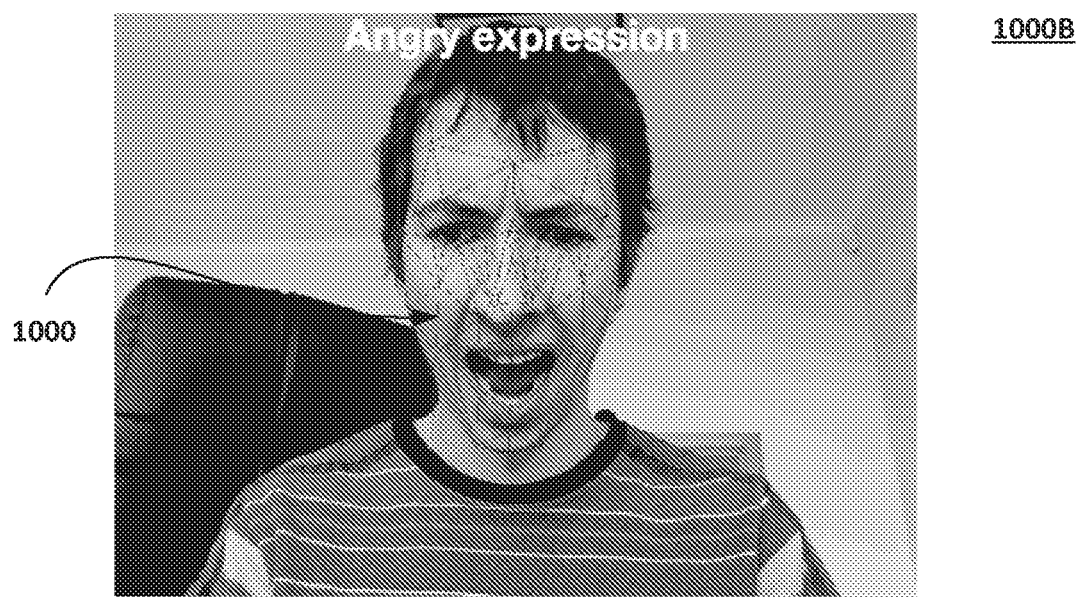
FIG. 10B shows an example negative facial emotion with a mesh aligned to a face area.

At step 945, based on the result of the comparison made at step 940, the computing device selects a facial emotion from the plurality of reference facial emotions. In other words, at the steps 940 and 945, the computing device determines that the at least one deformation of the mesh refers to a particular facial emotion. FIGS. 10A and 10B show two video images 1000A and 1000B, respectively, which illustrate example facial emotions that can be identified by this method 900. In particular, FIG. 10A shows an example positive facial emotion with a mesh 1000 aligned to a face area, while FIG. 10B shows an example negative facial emotion (e.g. anger) with the mesh 1000 aligned to corresponding face area.

At step 950, the computing device generates quality metrics which include at least one work quality parameter associated with the individual based on the at least one facial emotion. As discussed above, the work quality parameter may include one or more of the following: a tiredness characteristic of the individual, negative emotion characteristic of the individual, positive emotion characteristic of the individual, and smile characteristic of the individual. Some or each of these characteristics and parameters can be time-stamped. Moreover, they can be associated with a particular or predetermined period. For example, some or each of these characteristics and parameters can be associated with particular video chat sessions or their respective portions. In an embodiment, some or each of these characteristics and parameters can be generated every second, every 2 seconds, every 3 seconds, and so forth. Moreover, some or each of these characteristics and parameters can be attributive to certain portions of video chats, such that they can characterize every ten seconds of the video chats. In yet more embodiments, some or each of these characteristics and parameters can identify a quality in objective or subjective units. For example, a smile characteristic of the individual may indicate whether or not the individual smiled during a predetermine period of video chat with a customer, and if he smiled, for how long he smiled.

At optional step 955, the computing device can optionally record the quality metrics of the individual as generated at step 950 in an employee record (profile) which is stored in a memory such as database 220. Moreover, at this optional step 955, the computing device can aggregate the quality metrics associated with the individual over a predetermined period to produce a work performance characteristic of the individual. The work performance characteristic can indicate an overall psychological or emotional status of the individual for a particular period (e.g., a day, week, month, quarter, year). For example, the work performance characteristic can be calculated as a point value, which can range, for instance, between 0 and 100. In another example, the work performance characteristic can suggest whether the individual was effective or non-effective, whether or not he acted positively with customers.

Further, the individual (i.e., an employee or agent), other employees, customers, supervisors, directors, and/or human resources managers can access, review and analyze the recorded quality metrics and work performance characteristics (if generated). For these ends, the quality metrics and work performance characteristics can be stored on a server so as to be available over web service or website.

In some embodiments, the recorded quality metrics and/or work performance characteristic can be presented in graphs, charts, or tables. In yet more embodiments, the computing device may generate recommendations, tips, alerts, notifications or other texts based on the recorded quality metrics and work performance characteristics. These recommendations, tips, alerts, notifications or other texts can be automatically transmitted to the individual or his manager.

In some embodiments, the computing device may determine an emotional status of the individual by combining data related to the determined facial emotion with other data. In one example, the emotional status can be determined based on facial emotions and gestures of the customer. For these ends, the computing device may track individual's motions on the video, identify one or more gestures, and determine that at least one of the gestures relates to a predetermined emotion, such as a negative emotion or positive emotion. Further, the computing device may combine data associated with the determined facial emotion and data associated with the identified gesture, and generate an emotional status of individual. Similar to above, the emotional status determined as a combination of facial emotion and gesture data can be used for generating work quality metrics.

Figure 11:
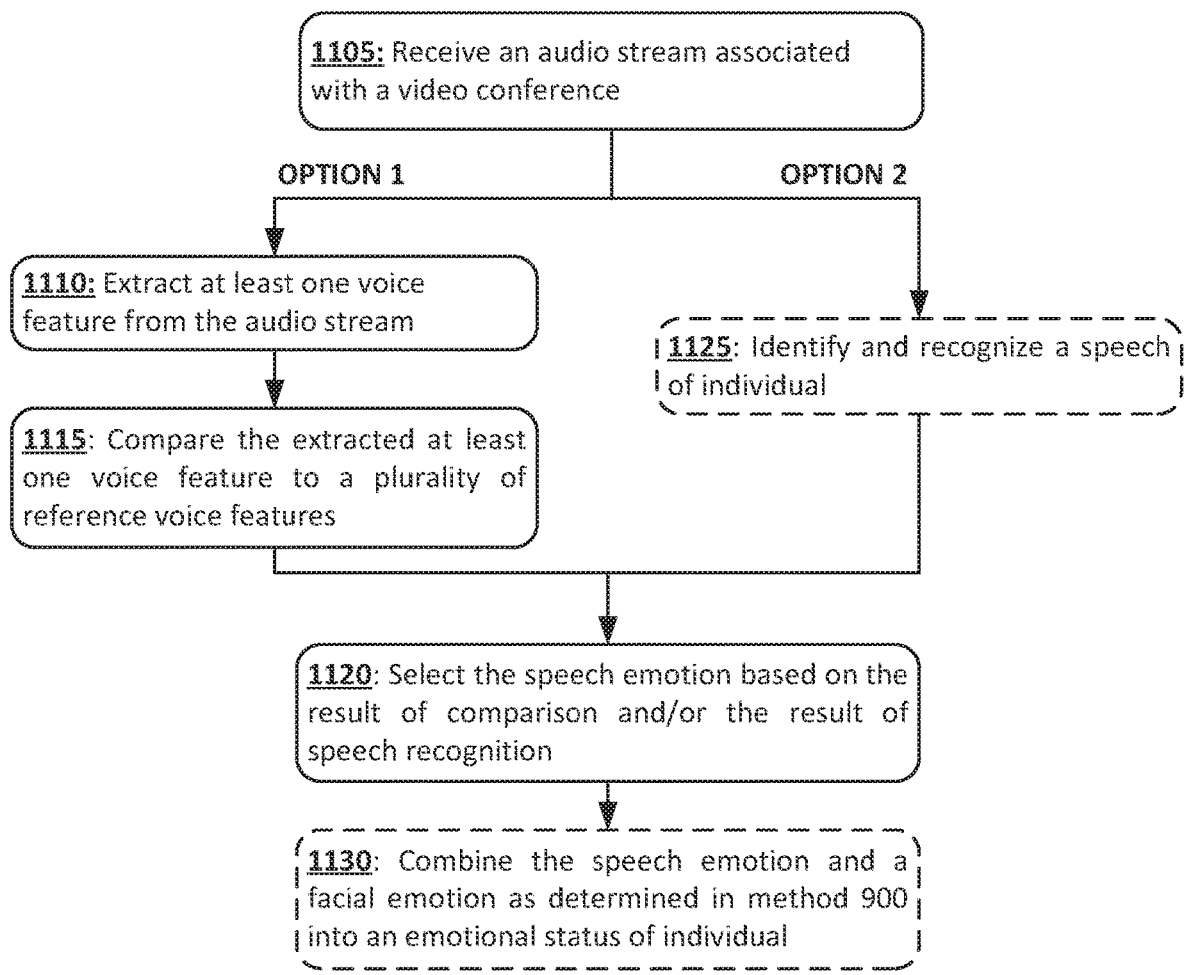
FIG. 11 is a process flow diagram showing an example process for audio emotion recognition that can be used in the method of FIG. 9.

In some embodiments, the computing device may determine an emotional status of the individual by combining data related to the determined facial emotion and speech emotion. FIG. 11 is a process flow diagram showing an example process 1100 for audio emotion recognition for determining speech emotions which can be used in method 900 shown in FIG. 9.

Process 1100 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of system 400. Note that below recited steps of process 1100 may be implemented in an order different than described and shown in FIG. 11. Moreover, process 1100 may have additional steps not shown herein, but which can be evident for those skilled in the art from the present disclosure. Process 1100 may also have fewer steps than outlined below and shown in FIG. 11.

At step 1105, a computing device receives an audio stream associated with the video received at step 910. In other words, at step 1105, the computing device receives the audio stream of a videoconferencing session between an individual, such as a customer service representative or service provider, and another user, such as a customer.

At step 1110, the computing device extracts at least one voice feature from the audio stream. Among voice features, there can be one or more of the following: a maximum value of fundamental frequency, standard deviation of fundamental frequency, range of fundamental frequency, mean value of fundamental frequency, mean of bandwidth of first formant, mean of bandwidth of second formant, standard deviation of energy, speaking rate, slope of fundamental frequency, maximum value of first formant, maximum value of second formant, maximum value of energy, range of energy, range of second formant, and range of first formant.

At step 1115, the computing device compares the extracted at least one voice feature to a plurality of reference voice features. Similar to method 900, this step can be performed with the help of a machine-learning algorithm such as SVM, CNN, and a statistical or heuristic algorithm.

At step 1120, the computing device selects the speech emotion based on the comparison of the extracted at least one voice feature to the plurality of reference voice features.

In some embodiments, in addition to steps 1110 and 1115, or instead of steps 1110 and 1115, the computing device, at optional step 1125, can identify and recognize a speech of the second individual (i.e., transform speech input into text input for further processing). At step 1125, one or more natural language processing processes can be applied to detect speech and transform it into text.

Based on the analysis of recognized speech, at step 1120, the computing device may select or facilitate selection of a particular speech emotion as the result of the presence of certain keywords or phrases in the recognized speech. For example, when recognized speech includes vulgar, offensive or vile slang words, a negative emotion can be selected and attributed to the audio stream.

At step 1130, the computing device optionally combines the speech emotion and facial emotion as determined in method 900 into a single emotional status of the individual. Further, the single emotional status can be used to generate work quality metrics as described above.

7. CONCLUSION

Thus, methods and systems for videoconferencing involving emotion recognition and workforce analytics have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method, the method comprising:
    receiving, by one or more processors, an audio stream comprising a conversation between at least two individuals;
    detecting a voice feature comprising a speaking rate of a first individual of the at least two individuals;
    determining that the voice feature comprising the speaking rate of the first individual corresponds to a speech emotion of a plurality of speech emotions, the determining including comparing the voice feature comprising the speaking rate to a reference voice feature, and selecting the speech emotion based at least on the comparing;
    identifying an emotional status for the first individual based on the speech emotion that corresponds to the voice feature of the first individual, the identifying an emotional status for the first individual further comprising:
    detecting the first individual in one or more of frames of a video stream;
    dynamically determining, over the one or more frames, a deformation of a virtual face mesh of the first individual;
    locating feature reference points of the first individual;
    aligning the virtual face mesh to the first individual in one or more of the frames based at least in part on the feature reference points;
    determining that the deformation refers to at least one facial emotion selected from a plurality of reference facial emotions; and
    evaluating the identified emotional status for the first individual based on the at least one facial emotion of the first individual within the video stream and the speech emotion;
    storing a timestamped work quality parameter representing the identified emotional status in a database in a profile associated with the first individual;
    associating the timestamped work quality parameter with the audio stream;
    aggregating timestamped work quality parameters in the database over a predetermined period to produce a work performance characteristic and determining a value of the work performance characteristic; and
    generating an alert when one or more work quality parameters associated with the first individual exceed a determined threshold value.

2. The method of claim 1, further comprising establishing a video conference between the at least two individuals and obtaining vital biological parameters for the first individual to determine the emotional status.

3. The method of claim 1, further comprising applying a machine learning algorithm comprising a neural network to the audio stream to extract the voice feature.

4. The method of claim 1, further comprising encrypting the audio stream before transmitting the audio stream for analysis, wherein the work quality parameter includes a positive emotion characteristic of the first individual.

5. The method of claim 1, wherein the work quality parameter includes a smile characteristic of the first individual.

6. The method of claim 1, further comprising recognizing speech in the audio stream.

7. The method of claim 1, further comprising combining a facial emotion and the speech emotion to generate the work quality parameter of the first individual.

8. A system, comprising:
a computing device including at least one processor and a memory storing processor-executable codes, which, when implemented by the at least one processor, cause the at least one processor to perform operations comprising:
receiving an audio stream comprising a conversation between at least two individuals;
detecting a voice feature comprising a speaking rate of a first individual of the at least two individuals;
determining that the voice feature comprising the speaking rate of the first individual corresponds to a speech emotion of a plurality of speech emotions, the determining including comparing the voice feature comprising the speaking rate to a reference voice feature, and selecting the speech emotion based at least on the comparing;
identifying an emotional status for the first individual based on the speech emotion that corresponds to the voice feature of the first individual, the identifying an emotional status for the first individual further comprising:
detecting the first individual in one or more of frames of a video stream;
dynamically determining, over the one or more frames, a deformation of a virtual face mesh of the first individual;
locating feature reference points of the first individual;
aligning the virtual face mesh to the first individual in one or more of the frames based at least in part on the feature reference points;
determining that the deformation refers to at least one facial emotion selected from a plurality of reference facial emotions; and
evaluating the identified emotional status for the first individual based on the at least one facial emotion of the first individual within the video stream and the speech emotion;
storing a timestamped work quality parameter representing the identified emotional status in a database in a profile associated with the first individual;
associating the timestamped work quality parameter with the audio stream;
aggregating timestamped work quality parameters in the database over a predetermined period to produce a work performance characteristic and determining a value of the work performance characteristic; and
generating an alert when one or more work quality parameters associated with the first individual exceed a determined threshold value.

9. The system of claim 8, further comprising operations for establishing a video conference between the at least two individuals and enabling access to a display of the work quality parameter via a website.

10. The system of claim 8, further comprising operations for periodically generating each work quality parameter in a plurality of work quality parameters.

11. The system of claim 8, wherein the voice feature comprises a maximum value of fundamental frequency, standard deviation of the fundamental frequency, a range of the fundamental frequency, a slope of the fundamental frequency, and a mean of the fundamental frequency.

12. The system of claim 8, wherein the voice feature comprises a mean of bandwidth of a first formant, a mean of bandwidth of a second formant, a standard deviation of energy, a maximum value of the energy, a range of the energy, a maximum value of the first formant, a maximum value of the second formant, and a range of the first and second formants.

13. A non-transitory processor-readable medium having instructions stored thereon, which when executed by one or more processors, cause the one or more processors to perform operations, comprising:
receiving an audio stream comprising a conversation between at least two individuals;
detecting a voice feature comprising a speaking rate of a first individual of the at least two individuals;
determining that the voice feature comprising the speaking rate of the first individual corresponds to a speech emotion of a plurality of speech emotions, the determining including comparing the voice feature comprising the speaking rate to a reference voice feature, and selecting the speech emotion based at least on the comparing;
identifying an emotional status for the first individual based on the speech emotion that corresponds to the voice feature of the first individual, the identifying an emotional status for the first individual further comprising:
detecting the first individual in one or more of frames of a video stream;
dynamically determining, over the one or more frames, a deformation of a virtual face mesh of the first individual;
locating feature reference points of the first individual;
aligning the virtual face mesh to the first individual in one or more of the frames based at least in part on the feature reference points
determining that the deformation refers to at least one facial emotion selected from a plurality of reference facial emotions; and
evaluating the identified emotional status for the first individual based on the at least one facial emotion of the first individual within the video stream and the speech emotion;
storing a timestamped work quality parameter representing the identified emotional status in a database in a profile associated with the first individual;
associating the timestamped work quality parameter with the audio stream;
aggregating timestamped work quality parameters in the database over a predetermined period to produce a work performance characteristic and determining a value of the work performance characteristic; and
generating an alert when one or more work quality parameters associated with the first individual exceed a determined threshold value.

* * * * *